ommitted

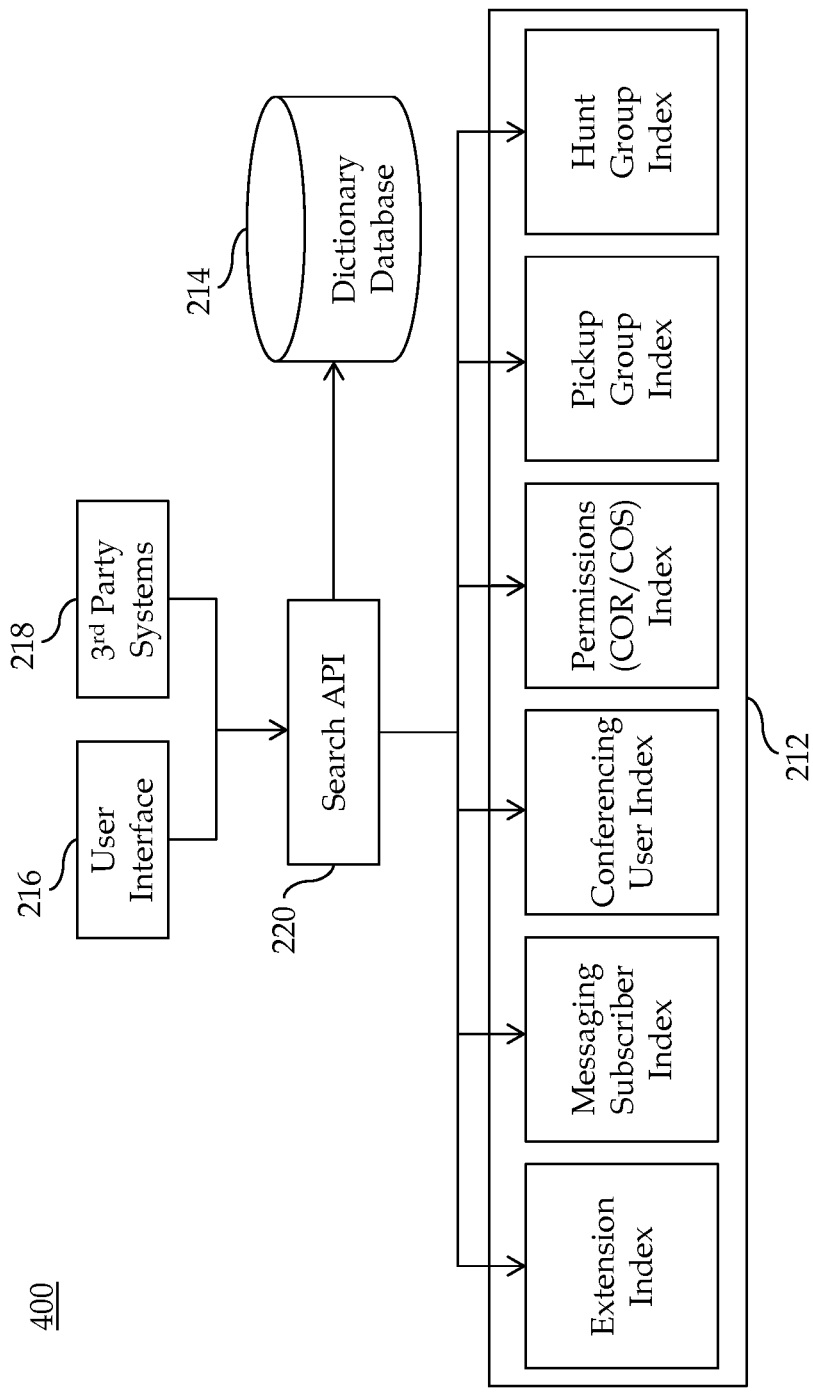

| Index Server Mapping | Dictionary Item |
|---|---|
| Extension index | Extension |
| | Station |
| | Phone |
| Pickup group | Pickup group |
| | Pickup |
| | Pickupgroup |

FIG. 4B

SYSTEMS AND METHODS FOR INDEXING AND SEARCHING ADMINISTRATIVE DATA

CROSS-REFERENCE TO RELATED APPLICATIONS

This application claims the benefit of U.S. Provisional Patent Application Ser. No. 61/772,282, filed Mar. 4, 2013, entitled "UNIFIED COMMUNICATION INDEXING AND SEARCH", which is incorporated herein by reference in its entirety.

BACKGROUND

Field of the Invention

Embodiments of the present invention generally relate to a system and method for managing administrative data of a contact center and particularly to a system and method for indexing and searching the administrative data of the contact center.

Description of Related Art

Contact centers are employed by many enterprises to service inbound and outbound contacts from customers. A typical contact center includes a switch and/or server to receive and route incoming packet-switched and/or circuit-switched contacts and one or more resources, such as human agents and automated resources (e.g., Interactive Voice Response (IVR) units), to service the incoming contacts or work items. Contact centers distribute contacts, whether inbound or outbound, for servicing to any suitable resource according to predefined criteria. In many existing systems, the criteria for servicing the contact from the moment that the contact center becomes aware of the contact until the contact is connected to an agent are client or operator-specifiable (i.e., programmable by the operator of the contact center), via a capability called vectoring. Normally in present-day Automatic Call Distributions (ACDs) when the ACD system controller detects that an agent has become available to handle a contact, the controller identifies all predefined contact-handling queues for the agent (usually in some order of priority) and delivers to the agent the highest-priority, oldest contact that matches the agent's highest-priority queue. Generally, the only condition that results in a contact not being delivered to an available agent is that there are no contacts waiting to be handled.

The primary objective of contact center management is to ultimately maximize contact center performance and profitability. An ongoing challenge in contact center administration is monitoring and optimizing contact center efficiency. The contact center efficiency is generally measured in two ways that are service level and match rate.

Service level is one measurement of the contact center efficiency. Service level is typically determined by dividing the number of contacts accepted within the specified period by the number accepted plus the number that were not accepted, but completed in some other way (e.g., abandoned, given busy, canceled, flowed out etc.). Of course, service level definitions may vary from one enterprise to another.

Match rate is another indicator used in measuring the contact center efficiency. Match rate is usually determined by dividing the number of contacts accepted by a primary skill level agent within a period of time by the number of contacts accepted by any agent for a queue over the same period. An agent with a primary skill level is one that typically can handle contacts of a certain nature most effectively and/or efficiently. There are other contact center agents that may not be as proficient as the primary skill level agent, and those agents are identified either as secondary skill level agents or backup skill level agents. As can be appreciated, contacts received by a primary skill level agent are typically handled more quickly and accurately or effectively (e.g., higher revenue attained) than a contact received by a secondary or even backup skill level agent. Thus, it is an objective of most contact centers to optimize match rate along with service level.

In addition to service level and match rate performance measures, contact centers use other Key Performance Index (KPI), such as revenue, estimated, actual, or predicted wait time, average speed of answer, throughput, agent utilization, agent performance, agent responsiveness and the like, to calculate performance relative to their Service Level Agreements (SLAs). Operational efficiency is achieved when KPI are managed near, but not above, SLA levels.

Throughput is a measure of the number of calls/contact requests or work requests that can be processed in a given amount of time. Agent utilization is a measure of how efficiently agents' time is being used. Customer service level is a measure of the time customers spend waiting for their work to be handled. Company contact center customers wish to provide service to as many requests as possible in a given amount of time, using the least number of agents to do so, and minimizing the wait time for their customers that can increase the service level agreement of the contact center.

Typically, in a contact center environment, there are various communication devices that are connected to each other. For example, a voice mail server is connected to, let say, 10 different extensions in a contact center. These extensions are further connected to coverage paths to link with other communication devices. Now, if a user or a supervisor of the contact center desires to access administrative data of an agent at an extension, he may only be able to access the data of that particular extension. However, information of other extensions that is associated with the agent and which can be relevant for the supervisor is not provided. Further, if the supervisor of the contact center desires to change one of a button of an agent's extension, the supervisor can search for the agent's contact center record in a conventional system, and change the button of the agent's extension. However, the supervisor is not aware of a domain or group to which the agent is associated with. Further, the supervisor cannot be able to see the effect of changing the button of the agent's extension on other extensions.

There is thus a need for a system and method for indexing and storing the administrative data and further enables the agent of the contact center to access the data in a faster way.

SUMMARY

Embodiments in accordance with the present invention provide a data management system for indexing administrative data of a contact center. The data management system includes one or more unified communication devices configured to store the administrative data. The data management system further includes a crawler configured to collect the administrative data from the one or more unified communication devices. The data management system further includes a probing device configured to enable the crawler to communicate and retrieve the administrative data from the one or more unified communication devices. The data management system further includes a temporary database configured to store the collected administrative data; wherein the temporary database stores the collected administrative data in a plurality of flat file tables. The data management system further includes an indexing server configured to index the stored administrative data; wherein the indexed administrative data is searchable through one or more user search queries.

Embodiments in accordance with the present invention further provide a computer-implemented method for indexing administrative data of a contact center. The computer-implemented method includes retrieving one or more connection details and one or more lists of unified communication devices from a configuration database, collecting, by a crawler, the administrative data at predefined intervals from the one or more unified communication devices, and storing the collected administrative data into a temporary database, wherein the collected administrative data is indexed by an indexing server.

Embodiments in accordance with the present invention further provide a computer-implemented method for searching administrative data of a contact center. The method includes receiving one or more search queries from a user, segmenting the one or more search queries into a plurality of different phrases, matching the plurality of different phrases with one or more dictionary items, performing one or more lookups on a plurality of indexes based on the one or more search queries received from the user, and displaying one or more search query results to the user.

The present invention can provide a number of advantages depending on its particular configuration. First, the present invention provides a system and a method for indexing the administrative data of the contact center. The indexing of the administrative data enables a user to access the administrative data from the unified communication devices in a faster way. Further, the present invention indexes the administrative data and stores it in a plurality of indexes of an indexing server, so that an agent of the contact center may easily access the data. Further, the present invention enables the user to manage or optimize configuration of an agent's extension. For example, the user may change one of the buttons of an agent's extension telephone by accessing the administrative data of that agent.

Next, the present invention provides additional information associated with a user's search queries. For example, if the user triggers a search query for "Alex extension" then the present invention provide data for the "Alex extension" along with additional data such as extensions of a pickup group or a hunt group which are associated with Alex. In an embodiment of the present invention, the additional information may be represented as a set of hyperlinks that allows the user to access configuration data of each of the hyperlinks. Therefore, the present invention provides a chain of links associated with the user's search query. Further, one or more lookups performed by the present invention is dynamic and the search results are displayed in an order based on the user's search queries. For example, if the user searches for "Alex extension" then the results may be displayed in an order, such as extension, then a pickup group, a hunt group, but if the user searches for "Alex pickup" the present invention may display result in an order, such as pickup group, and then the extension and the hunt group. Further, the search results may be displayed graphically to the user.

These and other advantages will be apparent from the disclosure of the present invention(s) contained herein.

The preceding is a simplified summary of the present invention to provide an understanding of some aspects of the present invention. This summary is neither an extensive nor exhaustive overview of the present invention and its various embodiments. It is intended neither to identify key or critical elements of the present invention nor to delineate the scope of the present invention but to present selected concepts of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings, and wherein:

FIG. 4A illustrates block diagram of the data management system for lookup of a user search query according to an embodiment of the present invention;

FIG. 4B illustrates indexing server matching of different phrases and synonyms of user's search queries to an index of the indexing server according to an embodiment of the present invention;

Figure 1:
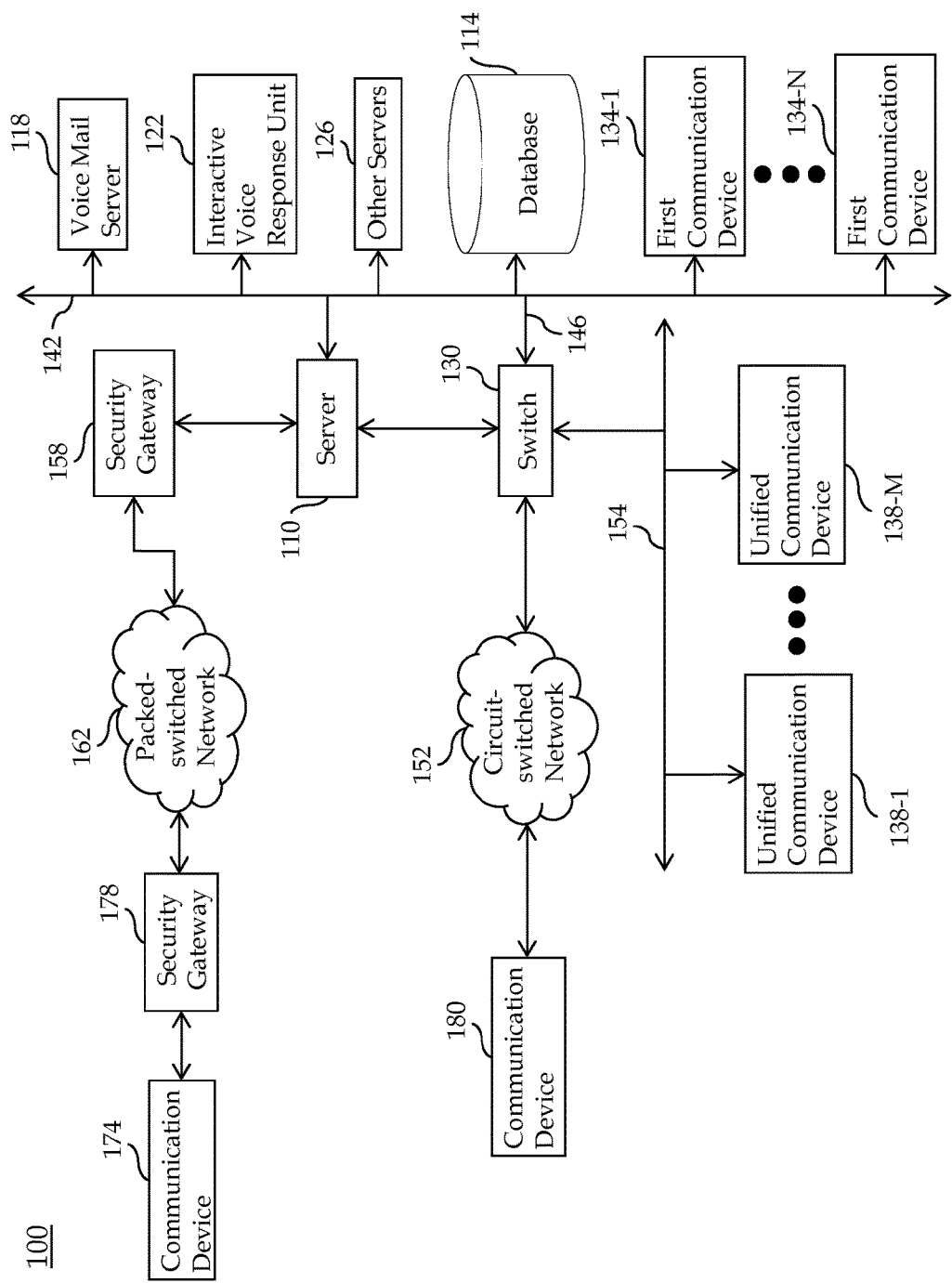
FIG. 1 illustrates a block diagram depicting a contact center according to an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

The present invention will be illustrated below in conjunction with an exemplary communication system, e.g., the Avaya Aura® system. Although well suited for use with, e.g., a system having an Automatic Call Distribution (ACD) or other similar contact processing switch, the present invention is not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the present invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a Private Branch Exchange (PBX), an ACD, an enterprise switch, or other type of communications system switch or server, as well as other types of processor-based communication control devices such as media servers, computers, adjuncts, etc.

FIG. 1 shows an illustrative block diagram of a contact center 100 according to an embodiment of the present invention. The contact center 100 comprises a server 110, a database 114 containing information related to customers and agents other information that may enhance the value and efficiency of the contact center processing, and a plurality of servers, namely a voice mail server 118, an Interactive Voice Response unit (e.g., IVR) 122, and other servers 126, a switch 130, a plurality of working agents operating packet-switched (first) communication devices 134-1-N (such as computer work stations or personal computers), and/or circuit-switched unified communication devices 138-1-M, all interconnected by a Local Area Network (LAN) 142, (or Wide Area Network (WAN)). The unified communication devices 138-1-M may include, but is not restricted to, a Private Branch Exchange (PBX), an Internet Protocol Private Branch Exchange (IP PBX), a messaging system, a conferencing system, and so forth. The servers may be connected via optional communication lines 146 to the switch 130. As will be appreciated, the other servers 126 may also include a scanner (which is normally not connected to the switch 130 or Web Server), VoIP software, video call software, voice messaging software, an IP voice server, a fax server, a web server, an email server, and the like. The switch 130 is connected via a plurality of trunks to a circuit-switched network 152 (e.g., Public Switch Telephone Network (PSTN)) and via link(s) 154 to the unified communication devices 138-1-M. A security gateway 158 is positioned between the server 110 and a packet-switched network 162 to process communications passing between the server 110 and the packet-switched network 162. The security gateway 158 may be implemented as hardware such as via an adjunct processor (as shown) or as a chip in the server.

Although the preferred embodiment is discussed with reference to client-server architecture, it is to be understood that the principles of the present invention apply to other network architectures. For example, the present invention applies to peer-to-peer networks, such as those envisioned by the Session Initiation Protocol (SIP). In the client-server model or paradigm, network services and the programs used by end users to access the services are described. The client side provides a user with an interface for requesting services from the network, and the server side is responsible for accepting user requests and providing the services transparent to the user. By contrast in the peer-to-peer model or paradigm, each networked host runs both the client and server parts of an application program. Additionally, the present invention does not require the presence of packet- or circuit-switched networks.

The switch 130 and/or server 110 may be any architecture for directing contacts to one or more communication devices. In some embodiments of the present invention, the switch 130 may perform load-balancing functions by allocating incoming or outgoing contacts among a plurality of logically and/or geographically distinct contact centers. Illustratively, the switch 130 and/or server 110 may be a modified form of the subscriber-premises equipment sold by Avaya Inc. under the names Definity™ Private-Branch Exchange (PBX) based ACD system, MultiVantage™ PBX, Communication Manager™, S8300™ media server and any other media servers, SIP Enabled Services™, Intelligent Presence Server™, and/or Avaya Interaction Center™, and any other products or solutions offered by Avaya or another company. Typically, the switch 130/server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide ACD functionality. Other types of known switches and servers are well known in the art and therefore not described in detail herein.

The first communication devices 134-1-N may be packet-switched and may include, for example, IP hardphones such as the Avaya Inc.'s, 4600 Series IP Phones™, IP softphones such as Avaya Inc.'s, IP Softphone™, Personal Digital Assistants (PDAs), Personal Computers (PCs), laptops, packet-based H.320 video phones and conferencing units, packet-based voice messaging and response units, packet-based traditional computer telephony adjuncts, peer-to-peer based communication devices, and any other communication device.

The unified communication devices 138-1-M may be circuit-switched. Each of the communication devices 138-1-M corresponds to one of a set of internal extensions Ext-1-M, respectively. The unified communication devices 138-1-M may include, for example, wired and wireless telephones, PDAs, H.320 videophones and conferencing units, voice messaging and response units, traditional computer telephony adjuncts, and any other communication device.

It should be noted that the present invention does not require any particular type of information transport medium between switch, or server and first and second communication devices, i.e., the present invention may be implemented with any desired type of transport medium as well as combinations of different types of transport channels. In an embodiment of the present invention, a communication network may also be a cloud based network.

The packet-switched network 162 may be any data and/or distributed processing network, such as the Internet. The packet-switched network 162 typically includes proxies (not shown), registrars (not shown), and routers (not shown) for managing packet flows.

The packet-switched network 162 as shown in FIG. 1 is in communication with a first communication device 174 via a security gateway 178, and the circuit-switched network 152 with an external second communication device 180.

In a preferred configuration, the server 110, the packet-switched network 162, the first communication devices 134-1-N, the circuit-switched network 152, and the unified communication devices 138-1-M are Session Initiation Protocol (SIP) compatible and may include interfaces for various other protocols such as the Lightweight Directory Access Protocol (LDAP), Secure Shell (SSH) Protocol, H.248, H.323, Simple Mail Transfer Protocol (SMTP), Internet Message Access Protocol 4 (IMAP4), Integrated Services Digital Network (ISDN), E1/T1, and analog line or trunk.

It should be emphasized that the configuration of the switch 130, the server 110, user communication devices, and other elements as shown in FIG. 1 is for purposes of illustration only and should not be construed as limiting the present invention to any particular arrangement of elements.

As will be appreciated, the server 110 is notified via the LAN 142 of an incoming work item by the communications component (e.g., the switch 130, fax server, email server, Web Server, and/or other server) receiving the incoming work item as shown in FIG. 1. The incoming work item is held by the receiving telecommunications component until the server 110 forwards instructions to the component to forward or route the contact to a specific contact center resource, and/or first or unified communication devices 134-1-N, 138-1-M associated with a selected agent. The server 110 distributes and connects these work items to telecommunication devices of available agents based on the predetermined criteria noted above. When the server 110 forwards a voice contact (or first work item) to an agent, the server 110 also forwards customer-related information from the database 114 to the agent's computer work station for viewing (such as by a pop-up display) to permit the agent to better serve the customer to achieve desired business goals (e.g., an average revenue, a customer satisfaction (CSAT), a service level agreement etc.) of the contact center. Depending on the contact center configuration and current status of the business goals, the server 110 may reallocate the work items to the agents. The agents process the work items or contacts sent to them by the server 110. This embodiment is particularly suited for a Customer Relationship Management (CRM) environment in which customers are permitted to use any media to contact a business. In a CRM environment, both real-time and non-real-time contacts must be handled and distributed with equal efficiency and effectiveness.

Figure 2:
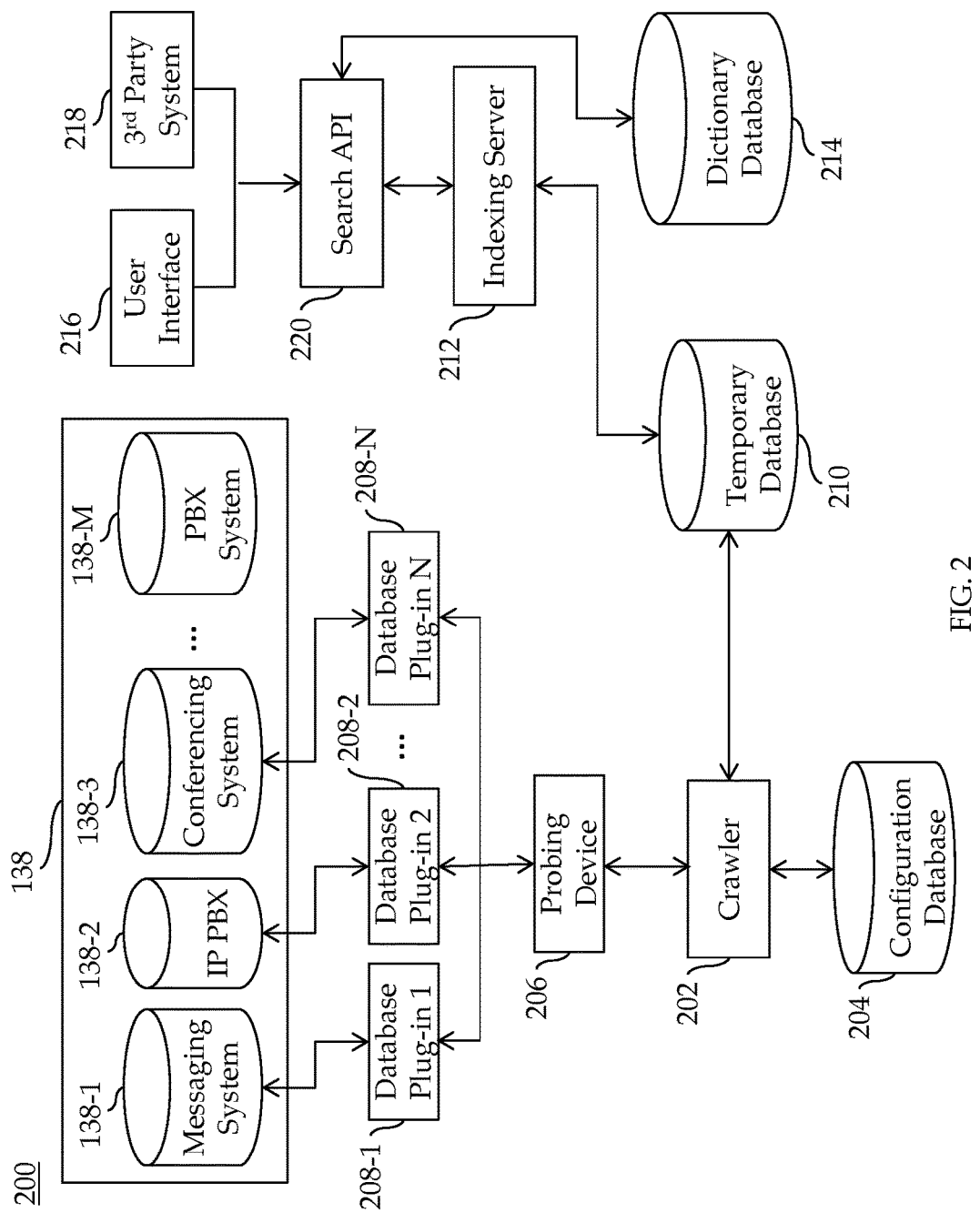
FIG. 2 illustrates block diagram of a data management system according to an embodiment of the present invention.

FIG. 2 illustrates block diagram of a data management system 200 according to an embodiment of the present invention. The data management system 200 includes a plurality of unified communication devices 138-1-M, a crawler 202, a configuration database 204, a probing device 206 and a plurality of probing plug-in interfaces 208-1-N. In an embodiment of the present invention, the plurality of unified communication devices 138-1-M may include, but is not restricted to, a unified communication IP PBX 138-1, a unified communication messaging system 138-2, a unified communication conferencing system 138-3, and so forth. The unified communication IP PBX 138-1 is used for telephony, the unified communication messaging system 138-2 is used for voice mails, and the unified communication conferencing system 138-3 is used for video or audio conferencing.

The plurality of unified communication devices 138-1-M may store administrative data of the contact center. In an embodiment of the present invention, the administrative data may include, but is not restricted to, an agent's username and personal details, an extension number of an agent, a pickup group extension number, a hunt group extension number, configuration data of associated extensions, and so forth. The unified communication devices 138-1-M may be a set of relational databases (for example, ORACLE SQL® databases, DB2® from IBM etc.) configured to store administrative data in an embodiment of the present invention. In an embodiment of the present invention, the unified communication devices 138-1-M may be a set of non-relational databases configured to store the administrative data. The plurality of unified communication devices 138-1-M may also include a set of relational databases with a set of non-relational databases in another embodiment of the present invention.

The crawler 202 is configured to automatically and repeatedly crawl in a Local Area Network (LAN) or Wide Area Network (WAN) environment that includes the plurality of unified communication devices 138-1-M. In an embodiment of the present invention, the LAN and WAN environment may be a contact center environment. Further, the crawler 202 is configured to access the plurality of unified communication devices 138-1-M at predefined intervals for collecting the administrative data of the contact center. The predefined intervals may include, but is not restricted to, an intraday interval, a daily interval, a weekly interval, and a monthly interval. In the intra daily interval, the administrative data is retrieved periodically from the unified communication devices 138-1-M at predefined time interval, for example, 1 minute, 15 minutes, 30 minutes, and so forth. In the daily interval, the administrative data is retrieved once a day from the unified communication devices 138-1-M and includes a single record for the day the customer report on. Next, in the weekly interval, the administrative data is retrieved once a week from the plurality of unified communication devices 138-1-M. Further, in the monthly interval, the administrative data is retrieved once a month from the plurality of unified communication devices 138-1-M. The predefined intervals may be configured by a user and the configuration of the user is then stored in the configuration database 204. In an embodiment of the present invention, the user may be an agent, a supervisor or a manager of the contact center.

The configuration database 204 may include connection details of the unified communication devices 138-1-M. In an embodiment of the present invention, the connection details may include, but is not restricted to, an Internet Protocol (IP) address, a hostname, a communication protocol, a username and password that authenticates the crawler 202 to connect with the unified communication devices 138-1-M, and so forth. The crawler 202 retrieves the connection details of the unified communication devices 138-1-M from the configuration database 204. In an embodiment of the present invention, the crawler 202 may retrieve the administrative data from the unified communication devices 138-1-M at the predefined intervals by using the connection details of the unified communication devices 138-1-M.

Further, the probing device 206 receives a request from the crawler 202 to connect with the plurality of unified communication devices 138-1-M and retrieve the administrative data. The probing device 206 uses the plurality of probing plug-in interfaces 208-1-N for retrieving the administrative data from the unified communication devices 138-1-M in an embodiment of the present invention. For example, the probing device 206 my use a probing plug-in interface that may use a Secure Shell (SSH) protocol for communicating with the unified communication devices 138-1-M, a probing plug-in interface that may use an LDAP protocol for communicating with the unified communication devices 138-1-M, and so forth. The probing device 206 uses the plurality of probing plug-in interfaces 208-1-N to connect communication links from the crawler 202 to the unified communication devices 138-1-M for retrieving the administrative data. For example, if the unified communication devices 138-1-M stores a table with data for 50 different agents, then the probing device 206 by using the plurality of probing plug-in interfaces 206-1-1N to retrieve the structure of the table as stored in the unified communication devices 138-1-M and transmits it to the crawler 202.

In another embodiment of the present invention, the crawler 202 is configured to store the retrieved administrative data into a temporary database 210. In an embodiment of the present invention, the temporary database 210 may use a set of flat file databases having tables to store the retrieved information of every unified communication managed objects. A flat file database is a database in which each database is represented as a single table and in which all of the records are stored as single rows of data. The unified communication managed objects may include, but is not restricted to, extensions, hunt groups, pickup groups, and so forth.

An indexing server 212 may index the retrieved administrative data stored in the temporary database 210. In an embodiment of the present invention, the indexed data may be searchable through the one or more search queries of the user. Further, a dictionary database 214 may include dictionary items associated with words or phrases of the user search queries. In an embodiment of the present invention, the dictionary items may be synonyms of name of indexes of the indexing server 212. In an embodiment of the present invention, the dictionary items may include English words of a dictionary.

The data management system 200 further includes a user interface 216 and a third party system 218. In an embodiment of the present invention, a user of the contact center may trigger one or more search queries by using the user interface 216. In an embodiment of the present invention, the search query may be a Structured Query Language (SQL) query. In another embodiment of the invention, the query may be formed in other query languages but not limited to .QL, Java Persistence Query Language (JPQL), or Query By Example (QBE).

The search query of the user is then passed to a search Application Programming Interface (API) 220 that is configured to search for index logic and access a plurality of indexes created by the indexing server 212. In an embodiment of the present invention, the search API 220 breaks the user's search query into different words or phrases and then matches the phrases or synonyms to the plurality of indexes of the indexing server 212. The accessed administrative data is then displayed to the user on the user interface 216 as a search result.

Figure 3:
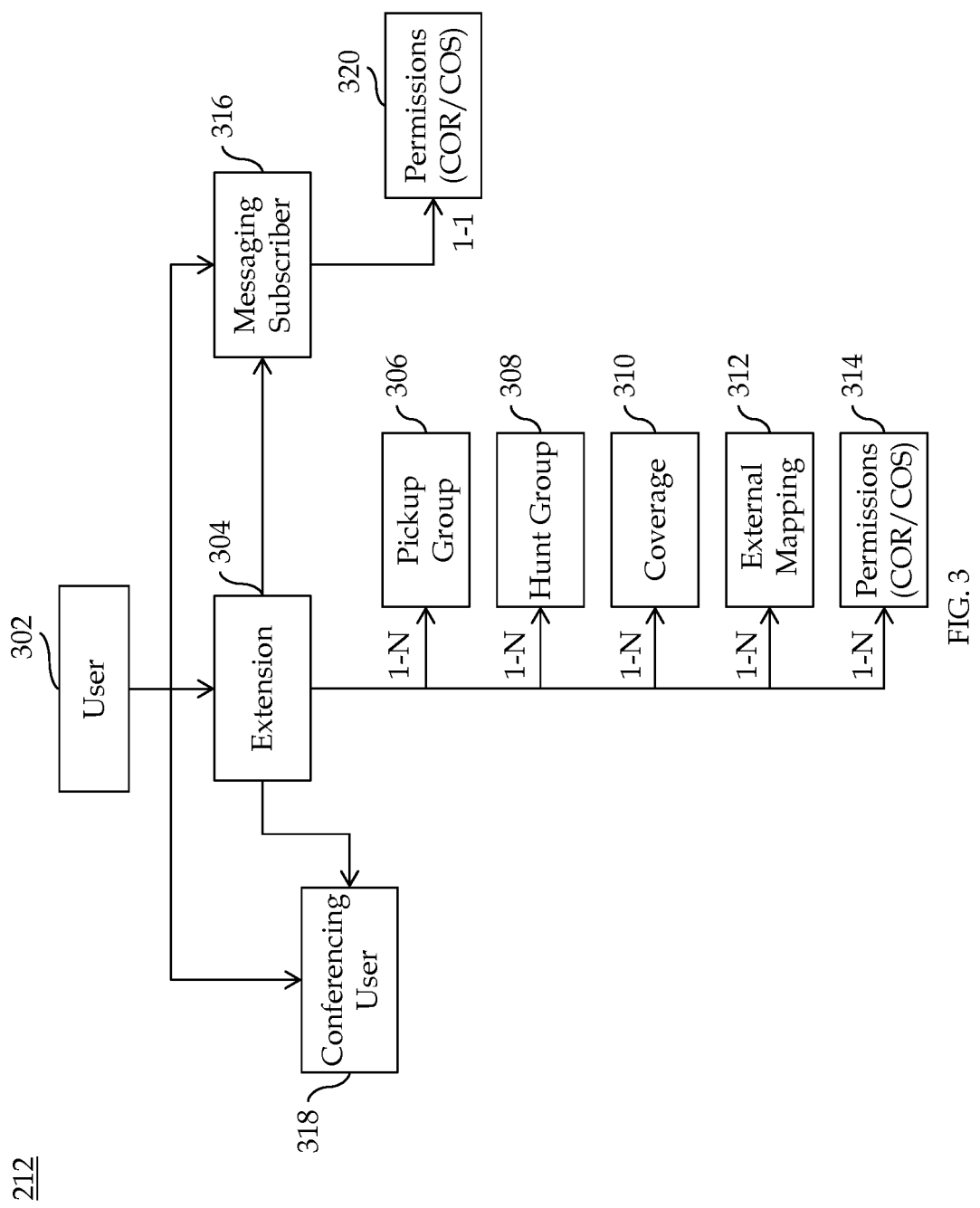
FIG. 3 illustrates block diagram of an indexing server for indexing administrative data of the contact center according to an embodiment of the present invention.

FIG. 3 illustrates block diagram of the indexing server 212 for indexing the administrative data according to an embodiment of the present invention. The index logic of the indexing server 212 explains how indexing of the administrative data is done. In an embodiment of the present invention, the indexing of the administrative data of the contact center is done based on a relationship between managed entities of the contact center. In an embodiment of the present invention, the managed entity may be a user or an extension of the contact center. These entities are managed between the plurality of unified communication devices 138-1-M, such as an IP PBX, messaging systems, conferencing systems etc. As shown in FIG. 3, a user 302 of the contact center may be linked to an extension 304. The user 302 may include, but is not restricted to, details of a plurality of users of the contact center. In an embodiment of the present invention, the details may include, but is not restricted to, a username, a user first name, a user last name, extensions assigned to a user, subscribers assigned to a user, assigned features, and so forth.

Further, the extension 304 may have different relationships in the data management system 200 with a plurality of groups. In an embodiment of the present invention, the extension 304 may include, but is not restricted to, details of the extensions such as an extension name, a class of service, a class of rejection, extension features, and so forth. The plurality of groups may include, but is not restricted to, a plurality of pickup groups 306-1-N, a plurality of hunt groups 308-1-N, a plurality of coverage groups 310-1-N, a plurality of external mapping groups 312-1-N, a plurality of permission groups 314-1-N, and so forth.

A pickup group is a list of extensions where each member of the group may answer a call on a telephone of another member from their own telephone. In an embodiment of the present invention, the pickup group 306 may include, but is not restricted to, details of the group 306, such as a pickup group name, a pickup group number, extensions assigned to the pickup group 306, and so forth.

A hunt group is a group of extensions that are organized to process specific calls. When an incoming call is received from a caller in a call center, the call is rotated through a pool of lines until a free line is found and the caller is connected to that line. The caller may hear a busy tone only when all the lines of the pool are engaged. In an embodiment of the present invention, the hunt group 308 may include, but is not restricted to, details of the hunt group 308 for example, a hunt group name, a hunt group number, extensions assigned to the hunt group 308, and so forth.

A permission group is a group that may include a class of service (COS) or a class of rejection (COR) as a parameter that are used to define permission or a rejection an extension may have on the unified communication devices. For example, a group A may have a need for extended voicemail message retentions while a group B may need the ability to forward incoming calls to a cell phone, and so forth. In an embodiment of the present invention, the permission group 314, may include details of the extensions that are assigned permissions (COS/COR). The details of the extensions that are assigned permissions (COS/COR) may include, but is not restricted to, a class of rejection, a class of service, role of a group, a group name, and so forth. Similarly, the coverage 310 may include details of a coverage group. The details may include, but is not restricted to, a coverage name, a coverage number, assigned coverage destinations, and so forth. The external mapping group 312 may include details of external mapping such as, an external mapped number, an internal mapped number, and so forth.

Further, the managed entities for example, the user 302, and the extension 304 may also be connected to a messaging subscriber 316 and a conferencing user 318.

The messaging subscriber 316 may be a group of users that may be subscribed for a messaging service. The messaging subscriber 316 may include details of the subscribers such as, a subscriber number, subscriber features, subscriber permission details, and so forth. A permission (COR/COS) 320 may include a class of service (COS) or a class of rejection (COR) as parameters that are used to define permission or a rejection of an extension for the messaging subscriber 316.

The conferencing user 318 may be a user that may be subscribed for providing audio or video conferencing services to the customers. The conferencing user 318 may include, but is not restricted to, all the details associated with a conferencing user, such as a username, extensions assigned to the user, assigned features, and so forth.

FIG. 4A illustrates block diagram of the data management system 200 for performing a lookup of a user search query according to an embodiment of the present invention. The data management system 200 includes the user interface 216 that is configured to receive one or more search queries from a user. The user triggers a search query by using the user interface 216 or the third party systems 218, for example, "Extension Arkady Pickup 1". In an embodiment of the present invention, the search query may be a SQL query. In another embodiment of the invention, the query may be formed in other query languages such as, but is not limited to .QL, Java Persistence Query Language (JPQL), or Query By Example (QBE). The search API 220 segments the search query received from the user into different phrases or words. In this case, the different phrases of the search query may include Extension+Arkady+Pickup+1. Each phrase of the search query is then matched with a dictionary item and the phrases that match with the dictionary items are parsed by the search API 220 in order to match a specific index in the indexing server 212. Each of the phrases and synonyms of the search queries are matched to an index of the indexing server 212. The dictionary database 214 may include dictionary items associated with words or phrases of the user search queries. In an embodiment of the present invention, the dictionary items may be synonyms of name of indexes of the indexing server 212. In an embodiment of the present invention, the dictionary items may include English words of a dictionary. As shown in FIG. 4B, the phrase "Extension" is matched with items such as, extension, station, and phone. Similarly, the phrase "pickup group" is matched with dictionary items such as pickup group, pickup, and pickup-group. In another embodiment of the present invention, each of the phrases is matched with the dictionary items for spelling mistakes of the words or phrases.

The indexing server 212 then performs one or more lookups in different indexes of the indexing server 212 in order to retrieve results. In this case, the search API 220 may perform the one or more lookups for each of the phrases in the indexes of the indexing server 212. The search API 220 may perform the lookup for the phrase "Extension" in an extension index that is associated with the agent "Arkady". In another embodiment of the present invention, the search API 220 may perform the lookup in the extension index for an extension of the phrase "Arkady 1". The phrase "Arkady" is a name of an agent whose administrative data is to be retrieved, and therefore is displayed as it is in a search result. Further, in the extension index, the phrase "pickup" is searched in the pickup group index 306.

In case, when a phrase of a search query has an exact match in the first index i.e., in the extension index, then the search API 220 may perform one or more lookups in each of the indexes of the indexing server 212 that is associated with the extension. For example, in this case, the search API 220 may found an exact match for the extension "Arkady", that is, let say, the extension number of "Arkady" is "5555", then the search API 220, may also perform one or more lookups in other indexes (e.g., pickup groups, hunt groups, etc.) of the indexing server 212. In the pickup index 306, the search API 220 performs a lookup to retrieve a list of pickup groups 306-1-N that stores "5555" extension. Similarly, in the hunt group index, the search API 220 performs a lookup to retrieve a list of hunt groups 308-1-N that stores "5555" extension. Similarly, other indexes are lookup to retrieve a list of groups that may store data associated with the extension.

Further, one or more search results may be displayed on the user interface 216 in an order such as, Extension name and number
Username and personal details
Assigned pickup group details
Assigned hunt group details By using the above mentioned order, the user interface 216 may show a full description of the search result. First row of the search result may display the result of the search query, whereas the following rows may display additional information such as hyperlinks to indexes that may store administrative data associated with the one or more search queries of the user.

In an embodiment of the present invention, if the user triggers a search query "pickup Arkady", then the search result may be displayed by the data management system 200 in an order, such as Assigned pickup group details
Username and personal details
Extension name and number
Assigned hunt group details By using the above mentioned order, the user interface may show a full description of the search result. First row of the search result may display the result of the search query, whereas the following rows may display additional information such as hyperlinks to indexes that may store administrative data associated with the one or more search queries of the user.

Therefore, the data management system 200 provides dynamic search results. For example, the data management system 200 may change the order of the search results based on the user's search results.

In an embodiment of the present invention, the search results may include a set of hyperlinks that may allow the user to access configuration data of each link. For example, if the user clicks on the hyperlink of the first row, he may access configuration details of the extension as stored in the indexes of the indexing server 212. The search results of the search queries of the user may be displayed graphically to the user in an embodiment of the present invention.

Figure 5:
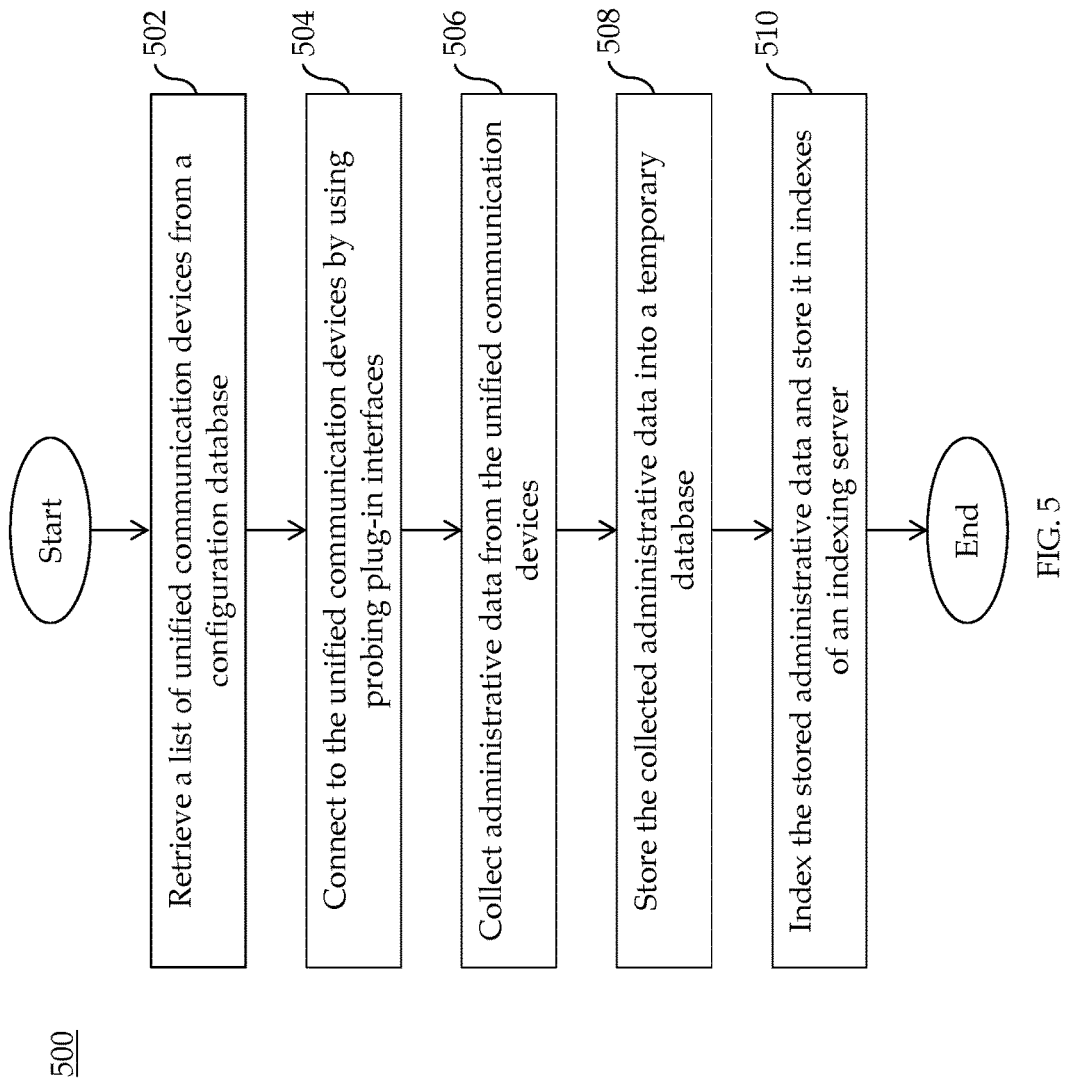
FIG. 5 depicts a flowchart of a method for indexing the administrative data according to an embodiment of the present invention.

FIG. 5 depicts a flowchart of a method 500 for indexing administrative data of the contact center according to an embodiment of the present invention.

At step 502, a data management system 200 retrieves a list of unified communication devices from a configuration database in an embodiment of the present invention. The list of the unified communication devices may include a list of plurality of unified communication devices from which the administrative data is to be retrieved. In an embodiment of the present invention, the administrative data may include, but is not restricted to, an agent's username and personal details, an extension number of an agent, a pickup group extension number, a hunt group extension number, configuration data of associated extensions, and so forth.

In another embodiment of the present invention, the data management system 200 may retrieve one or more connection details of the unified communication devices from the configuration database. The connection details may include, but is not restricted to, an Internet Protocol (IP) address, a hostname, a communication protocol, an input/output port, a username and password for authenticating with the unified communication devices, and so forth. In an embodiment of the present invention, the crawler is configured to retrieve the connection details and list of unified communication devices from the configuration database.

At step 504, the data management system 200 enables the crawler to connect with the plurality of unified communication devices of the contact center by transmitting a request to a probing device in an embodiment of the present invention. The data management system 200 uses a plurality of probing plug-in interfaces to connect the crawler of the data management system 200 to the plurality of unified communication devices for retrieving the administrative data. For example, the probing device 206 may use a probing plug-in interface that may use a Secure Shell (SSH) protocol for communicating with the unified communication device, a probing plug-in interface that may use an LDAP protocol for communicating with the unified communication device, and so forth. The probing device uses the plurality of probing plug-in interfaces to provide communication links from the crawler to the unified communication devices for retrieving the administrative data. For example, if a unified communication device stores a table with data of 50 different callers, then the probing plug-in interfaces retrieves structure of the table as it is stored in the unified communication devices and transmits it to the crawler of the data management system 200.

At step 506, the data management system 200 collects the administrative data from the plurality of unified communication devices at predefined interval in an embodiment of the present invention. The predefined intervals may include, but is not restricted to, an intra daily interval, a daily interval, a weekly interval, and a monthly interval. In the intra daily interval, the administrative data is retrieved periodically from the unified communication devices at predefined time interval for example, 1 minute, 15 minutes, 30 minutes, and so forth. In the daily interval, the administrative data is retrieved once a day and includes a single record for the day the customer report on. Next, in the weekly interval, the administrative data is retrieved once a week from the contact center unified communication devices. Further, in the monthly interval, the administrative data is retrieved once a month from the unified communication devices.

At step 508, the data management system 200 stores the collected administrative data into a temporary database in an embodiment of the present invention. In an embodiment of the present invention, the temporary database may use a set of flat file database having tables to store the collected administrative data of every unified communication managed objects. The unified communication managed objects may include, but is not restricted to, an extension, a hunt group, a pickup group, and so forth. The temporary database receives the administrative data from the crawler and at the end of a day stores the administrative data in flat tables in an embodiment of the present invention.

At step 510, the data management system 200 indexes the administrative data stored in the temporary database. The indexed administrative data is then stored in a plurality of indexes of the indexing server. In an embodiment of the present invention, the indexed data may be searchable through the one or more search queries of the user.

Figure 6:
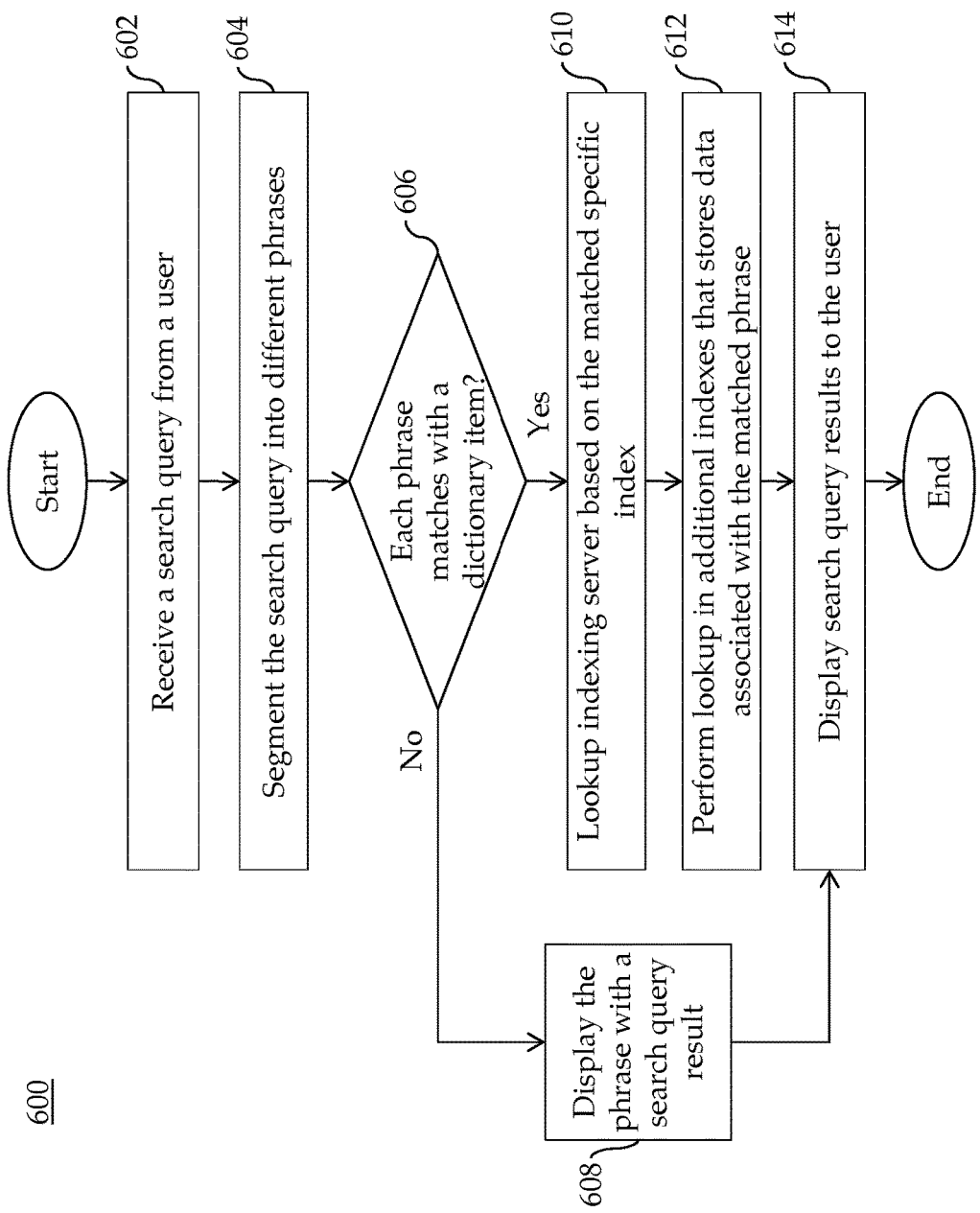
FIG. 6 depicts a flowchart of a method for performing a lookup and displaying a result to a user based on a search query received from the user according to an embodiment of the present invention.

FIG. 6 depicts a flowchart of a method 600 for performing a lookup and displaying a result to a user based on a search query received from the user according to an embodiment of the present invention.

At step 602, a data management system 200 receives a search query from a user in an embodiment of the present invention. The user may be an agent, a manager, or a supervisor of the contact center in an embodiment of the present invention. The user triggers a search query, using a user interface or third party systems, for example, get "extension Arkady pickup group 1". In an embodiment of the present invention, the search query may be a SQL query. In another embodiment of the invention, the query may be formed in other query languages, but is not limited to .QL, Java Persistence Query Language (JPQL), or Query By Example (QBE).

At step 604, the data management system 200 segments the user search query into different words or phrases in an embodiment of the present invention. For example, in this case, the user search query "extension Arkady pickup group 1" is segmented into different phrases and may include different phrases such as extension+Arkady+pickup+1.

At step 606, the data management system 200 determines whether each of the phrases or their synonyms of the search query is matched with a dictionary items. In an embodiment of the present invention, the dictionary items may be synonyms of name of indexes of the indexing server. For example, in this case, the phrase "extension" is matched with dictionary items such as extension, station, or phone. In an embodiment of the present invention, the dictionary items may also include English words of a dictionary. When it is determined that each phrase is matched with the dictionary items, the method 600 proceeds towards step 610. When any of the phrase does not match with the dictionary items, the method 600 proceeds towards step 608.

At step 608, the data management system 200 may display the phrase that does not match with the dictionary items as it is in a search query result. For example, in this case, the phrase "Arkady" is a name of an agent whose data is to be retrieved. Therefore, this phrase may be displayed as it is in the search query result.

At step 610, the data management system 200 performs lookup for each of the phrases across a plurality of indexes of an indexing server in an embodiment of the present invention. For example, the data management system 200 may perform lookup for the phrase "extension" in an extension index that is associated with the agent "Arkady". Further, the data management system 200 may perform the lookup in the extension index for extension of a phrase "Arkady 1". Further, in the extension index, the phrase "pickup" is searched in a pickup group index.

At step 612, the data management system 200 performs one or more lookups in additional indexes that stores administrative data associated with the matched phrase. For example, in this case, the data management system 200 may found an exact match for the extension "Arkady", that is, let say, the extension number of "Arkady" is "5555", then the data management system 200 may also perform lookup in other indexes (e.g., pickup groups, hunt groups, etc.) of the indexing server. In the pickup index, the data management system 200 performs a lookup to retrieve a list of pickup groups that stores "5555" extension. Similarly, in the hunt group index, the data management system 200 performs a lookup to retrieve a list of hunt groups that stores "5555" extension. Similarly, other indexes are lookup to retrieve a list of groups that may store data associated with the extension.

At step 614, the data management system 200 displays the search query result to the user. In an embodiment of the present invention, the search query result is displayed in the user interface of the data management system 200. The search result may be displayed in an order, for example, Extension name and number
Username and personal details
Assigned pickup group details
Assigned hunt group details By using the above mentioned order, the user interface may show a full description of the search result. First row of the search result may display the result of the search query, whereas the following rows may display additional information such as hyperlinks to indexes that may store administrative data associated with the one or more search queries of the user.

The exemplary systems and methods of this present invention have been described in relation to a contact center. However, to avoid unnecessarily obscuring the present invention, the preceding description omits a number of known structures and devices. This omission is not to be construed as a limitation of the scope of the present invention. Specific details are set forth to provide an understanding of the present invention. It should however be appreciated that the present invention may be practiced in a variety of ways beyond the specific detail set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device (s) and an associated computing device.

Furthermore, it should be appreciated the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the present invention.

A number of variations and modifications of the present invention can be used. It would be possible to provide for some features of the present invention without providing others.

For example in one alternative embodiment of the present invention, the systems and methods of this present invention can be implemented in conjunction with a special purpose computer, a programmed microprocessor or microcontroller and peripheral integrated circuit element(s), an ASIC or other integrated circuit, a digital signal processor, a hardwired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, non-volatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a controller and memory, a special purpose computer, a microprocessor, or the like. In these instances, the systems and methods of this present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the present invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. The foregoing is not intended to limit the present invention to the form or forms disclosed herein. In the foregoing Detailed Description for example, various features of the present invention are grouped together in one or more embodiments, configurations, or aspects for the purpose of streamlining the disclosure. The features of the embodiments, configurations, or aspects of the present invention may be combined in alternate embodiments, configurations, or aspects other than those discussed above. This method of disclosure is not to be interpreted as reflecting an intention that the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A data management system for indexing administrative data of a contact center, the data management system comprising:
    one or more unified communication devices configured to store the administrative data;
    a memory device storing executable instructions; and
    a processor in communication with the memory device, wherein the processor, when executing the executable instructions:
        collects the administrative data using a crawler configured to collect the administrative data from the one or more unified communication devices;
        implements a probing device configured to enable the crawler to communicate with, and retrieve the administrative data from, the one or more unified communication devices;
        provides the collected administrative data to a temporary database configured to store the collected administrative data; wherein the temporary database stores the collected administrative data in a plurality of flat file tables; and
        indexes the administrative data stored in the temporary database;
    wherein the indexed administrative data is searchable through one or more user search queries.

2. The data management system of claim 1, wherein the administrative data comprises at least one of an agent's username and personal details, an extension number, a pickup group extension number, a hunt group extension number, or configuration data of associated extensions.

3. The data management system of claim 1, wherein the unified communication devices comprise one or more of an Internet Protocol Private Branch Exchange (IP PBX) system, a Private Branch Exchange (PBX) system, a messaging system, or a conferencing system.

4. The data management system of claim 1, wherein the probing device comprises one or more plug-in interfaces to retrieve the administrative data from the one or more unified communication devices.

5. The data management system of claim 1, wherein the crawler is further configured to retrieve one or more lists of unified communication devices from a configuration database.

6. The data management system of claim 1, wherein the crawler is further configured to retrieve one or more connection details of the one or more unified communication devices from the configuration database.

7. The data management system of claim 1, wherein the connection details comprise one or more of an Internet Protocol (IP) address, a hostname, a communication protocol, or a username and a password for authenticating with the one or more unified communication devices.

8. The data management system of claim 1, wherein the crawler is further configured to collect the administrative data at predefined intervals.

9. The data management system of claim 8, wherein the predefined intervals comprise one or more of an intra daily interval, a daily interval, a weekly interval, or a monthly interval.

10. The data management system of claim 1, further comprises a dictionary database configured to store synonyms of index phrases as one or more dictionary items.

11. A computer-implemented method for indexing administrative data of a contact center, the method comprising:
retrieving, by a computer, one or more connection details and one or more lists of unified communication devices from a configuration database;
collecting, by a crawler on the computer, the administrative data at predefined intervals from the one or more unified communication devices; and
storing, by the computer, the collected administrative data into a temporary database,
indexing the collected administrative data by an indexing server;
wherein the indexed administrative data is searchable through one or more user search queries.

12. The method of claim 11, wherein the administrative data comprises at least one of an agent's username and personal details, an extension number, a pickup group extension number, a hunt group extension number, or configuration data of associated extensions.

13. The method of claim 11, wherein the connection details comprise one or more of an Internet Protocol (IP) address, a hostname, a communication protocol, or a username and a password for authenticating with the one or more reporting systems.

14. The method of claim 11, wherein the predefined intervals comprise one or more of an intra daily interval, a daily interval, a weekly interval, or a monthly interval.

15. A computer-implemented method for searching administrative data of a contact center, the method comprising:
receiving, by a computer, one or more search queries from a user;
segmenting, by the computer, the one or more search queries into a plurality of different phrases;
performing, by the computer, one or more initial lookups on a plurality of indexes based on the one or more search queries received from the user;
performing, by the computer, one or more additional lookups in other indexes using an extension number found during an initial lookup; and
driving, by the computer, a display of one or more search query results to the user.

16. The method of claim 15, wherein the one or more search queries are based on Structured Query Language (SQL).

17. The method of claim 15, further comprising parsing the plurality of different phrases to match one or more specific indexes.

18. The method of claim 15, comprising:
matching the plurality of different phrases with one or more dictionary items, wherein each of the one or more dictionary items correspond to a respective index phrase; and
wherein performing the one or more initial lookups comprise identifying matches for the respective index phrases in the plurality of indexes.

19. The method of claim 15, wherein the one or more search query results are displayed graphically to the user.

* * * * *